Figure 1:
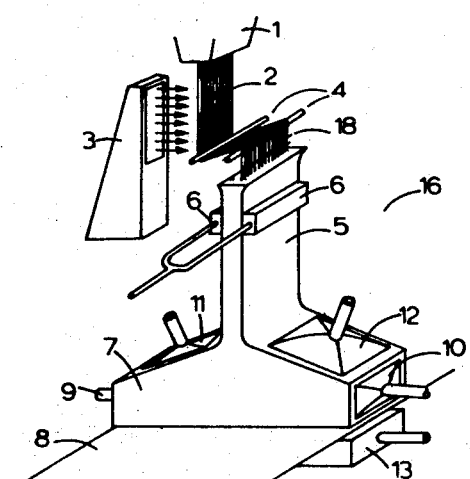

United States Patent [19]

Nommensen

[11] 3,720,361
[45] March 13, 1973

[54] PROCESS AND DEVICE FOR THE PREPARATION OF A PLASTIC FIBER FLEECE

[75] Inventor: Johan P. Nommensen, Stein, Netherlands

[73] Assignee: Stamicarbon N.V., Heerlen, Netherlands

[22] Filed: March 26, 1971

[21] Appl. No.: 128,401

[30] Foreign Application Priority Data

March 26, 1970 Netherlands ........................7004349

[52] U.S. Cl. ...........................................226/7, 226/97
[51] Int. Cl. ..............................................B65h 17/32
[58] Field of Search ...............226/7, 97; 19/160, 163

[56] References Cited

UNITED STATES PATENTS 3,485,428   12/1969   Jackson.................................226/97
3,597,175   8/1971    Pitt.........................................226/97

Primary Examiner—Richard A. Schacher
Attorney—Cushman, Darby & Cushman

[57] ABSTRACT

Process and apparatus for the preparation of a plastics fiber fleece, wherein filaments are moved towards a conveying plane and, prior to their lying down on the conveying plane, are zigzagged by means of air flows slanting upwards which are effected by simultaneously injecting air on one side of a free space and suctioning off air on the opposite side of the space whereby the air flows hit the filaments in the free space.

5 Claims, 6 Drawing Figures

PROCESS AND DEVICE FOR THE PREPARATION OF A PLASTIC FIBER FLEECE

The invention relates to a process for the preparation of a plastics fiber fleece, in which filaments are moved towards a conveying plane and, prior to their lying down on this conveying plane, are zigzagged.

This process makes it possible for a filament to be laid down over a width of a few decimeters. For the preparation of a fleece with a width of 4 to 5 meters, as is required by carpet-manufacturers who apply the fleece as a base for so-called wall-to-wall carpeting, it is usual that a number of units used in laying down the filaments are placed breadth-wise over the conveying plane. This solution calls for a costly and poorly accessible device by means of which it is difficult to prepare a fleece with a homogeneous structure, i.e., as a result of the unavoidable overlap strips.

The invention provides a process that does not include said disadvantages. According to this process the zigzag is effected by means of air flows slanting upwards, which hit the filaments in a free space.

The zigzag of a number of filaments, to lay them down on a conveying plane over a certain width, brought about by air flows, slanting downwards or directed, horizontally, is known by itself, see the U.S. Pat. No. 2.863.493.

The air flows slanting upwards make it possible for the filaments to be taken sideways over a large distance prior to being laid down. It is now possible to use only one unit to lay down the filaments over the full width of a belt measuring, for instance, 5 meters in width. In order to obtain a proper bracing in the fleece preference is given to the application of more units, each of which, though covering the full width of the belt, lays down the filaments under a different angle. In this case, for instance, one unit lays down the fibers in a direction normal to the direction of movement of the conveying plane, one unit in said direction of movement and two units in directions lying at an angle of 45° to the direction of movement, but being mutually normal to each other.

It is advisable to bring about each air flow by simultaneously injecting air on one side of the space and drawing off air on the opposite side of the space, as a result of which measure the air becomes dispersed to a lesser extent. A powerful airflow remains present in the unit over the entire width of the belt, so that the zigzag of the filaments over a large distance is highly promoted. This calls for large quantities of air. In order to avoid air movements in the machine shop and to halve the investment for fans, the air drawn off is injected again so that a closed cycle is obtained.

The invention also relates to a device of the kind which comprises a conveying plane and a feeding device for the filaments, by means of which device the process according to the invention can be carried out if the device also comprises a housing or chamber having the same width as the conveying plane, the housing or chamber being arranged between the conveying plane and the feeding device and being provided with two injection apertures facing each other and with draw-off openings located higher than said apertures.

By means of a circulation system, in which a fan has been included, each draw-off opening may be connected with an injection aperture located on the opposite side of the house.

Each housing or chamber therefore, is provided with two circulation systems. According to a suitable mode of realization there is only one fan for the two circulation systems and there are twin change-over mechanisms which are provided with drives and are used to alternately operate the two circulation systems.

The invention will now be explained on the basis of the drawing, where

FIG. 1 represents a method of realizing a unit used to lay down the filaments on a conveying plane, FIG. 2 a top view of a few units arranged one behind the other in the direction of conveyance over a conveying plane, FIG. 3 a conveying plane on the basis of which the pattern for laying down the filaments will be explained, FIG. 4 a fan, a changeover mechanism and a tubular system for a number of units, FIG. 5 an axial section according to the plane V in FIG. 4, and FIG. 6 a section along the line VI—VI in FIG. 2.

After having left a spinning nozzle, 1, a number of fluid filaments, 2, for instance polyamide fibers with a temperature of approximately 260° C, are cooled to about 145° C over a distance of, for instance, 30 cm, using air of 20° C from a blowing device, 3. The filaments, with a diameter of, for instance, 400 microns, will then have become reduced to, for instance, 340 microns by the stretching force exerted by the injection air. By means of a few pins, 4, which, dependent on the product to be processed, may be heated and which serve to provide a 'firm point' in the filaments to allow stretching, the filaments are led into a vertical drawing shaft, 5. Inside the shaft, 5, there are an injector and a Venturi — not shown in the drawing — which have been dimensioned in such a way that there is always a vacuum in the feed opening of the shaft. On the injector are installed two air-feed devices, 6, for the supply of the injection air. This air pulls the filaments through the Venturi, there to be drawn to a thickness of, for instance, 40 microns. The filaments then reach a space enclosed by a housing or chamber, 7, whose bottom is formed by a conveying plane, 8, of a conveyor not shown in the drawing. These filaments must now be zigzagged to permit their lying down over the entire width of the conveying plane. To this end, the housing or chamber, 7, has been provided with two injection apertures, 9 and 10, and two suction-off openings, 11 and 12 (FIGS. 1, 2 and 6), which are located at a higher level. The housing or chamber, 7, is alternately traversed by two air flows, one air flow proceeding from the injection aperture, 9, to the suction-off opening, 12, and the other from the injection aperture, 10, to the suction-off opening, 11. The conveying plane, 8, is permeable to air. At the bottom there is a suction chamber, 13. The fact that air is drawn off through the conveying plane effects that, after being zigzagged, the filaments settle smoothly on the conveying plane, 8.

Figure 6:
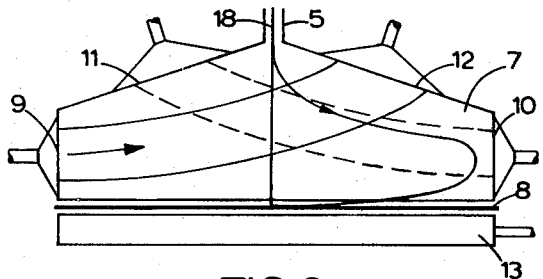

An example is now given for the calculation of the air flows, reference being made to FIG. 6.

The filaments leave the shaft, 5, at a rate of $v_d = 16$ m/sec. To change the direction of the filaments from vertical to horizontal an air velocity $v_1$ is required, which depends amongst others on the speed and the thickness of the filament. In the example in question the air velocity amounts to $v_1 = 50$ m/sec. This calls for a pressure difference $\alpha P$ equal to:

$$\tfrac{1}{2}\,\rho/g\,v^2 = \tfrac{1}{2}(1.3/10)\,50^2 = 160\ \text{kg/m}^2$$

where $\rho$ represents the specific gravity of air.

For the air to be led, in horizontal direction, from the edge of the conveying plane to the middle, when half the width of the conveying plane amounts to 2 m, a time of $$t = S/v = 2/50 = 1/25\ \text{sec}$$

will be needed.

The time required by the filaments to proceed from the middle to the edge and back to the middle amounts at a $v_d = 16$ m/sec to:

$$t = 4/16 = 1/4\ \text{sec}$$

The frequency with which the two air flows alternate with each other amounts to $$f = 1/\tfrac{1}{4} + 1/25 = 3$$

alternations per sec. The required height from the point where an air flow starts to deflect the filaments to the conveying plane, 8, amounts to:

$$S = \tfrac{1}{2}\,g\,t^2 + v\,t = \tfrac{1}{2}\cdot 10\,(1/25)^2 + 16\cdot 1/25 = 0.65\ \text{m}$$

This means that in the middle the housing or chamber should have a height of approximately 1.50 meters.

The required air quantity amounts to:
$Q_1 = $ velocity $\times$ dimensions of the injection aperture $=$ $$50 \times (1.00 \times 0.60) = 30\ \text{m}^3/\text{sec}$$

Figure 2:
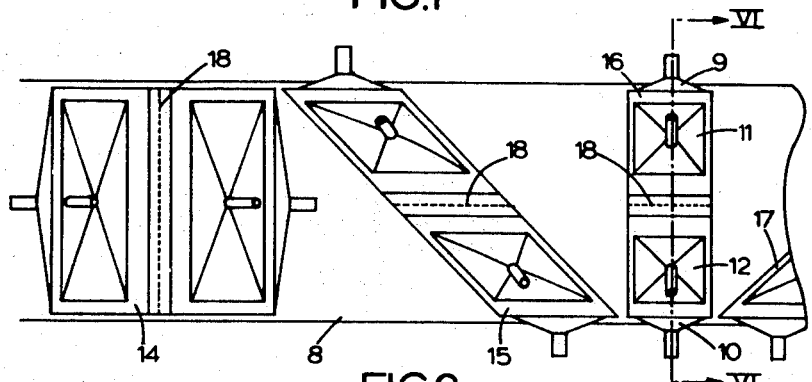

FIG. 2 shows four units, 14, 15, 16 and 17, over the conveying plane, 8. The curtain of filaments, 18, in the various drawing shafts is in the unit, 14, in a plane which is normal to the longitudinal direction of the conveying plane, 8, and in the units, 15, 16 and 17, in a plane which is parallel to the longitudinal direction of the conveying plane, 8.

In the unit, 14, the zigzag of the filaments is parallel to the longitudinal direction of the conveying plane, 8. Seen from above, a filament from the unit, 14, not considering turbulences, forms a straight line, 19, on the conveying plane, 8 (FIG. 3), but more or less a line 20 when seen from the side, the unit, 15, has been placed over the conveying plane, 8, at an angle of 45° to the longitudinal direction. Not considering the turbulences, this unit lays the filaments on the conveying plane according to a line 21. The injection apertures are provided with guide plates (not drawn) which lead the injection air into the proper direction, i.e., to the suction-off openings.

The unit, 16, lays the filaments on the conveying plane according to a sinusoidal line, 22. The unit, 17, is placed at an angle of 45° to the longitudinal direction of the conveying plane, 8, so that the plane of the filaments is normal to that of the unit, 15. The filaments are laid on the conveying plane according to a line, 23.

Figure 3:
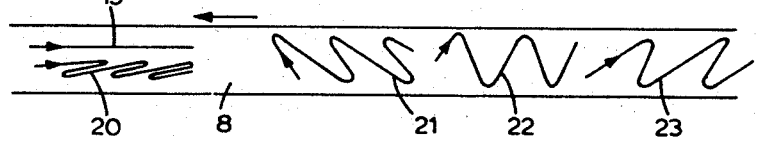

The four filament patterns according to FIG. 3, changed by turbulent movements of the filaments, are frequently laid, side by side and one crossing the other on the conveying plane, on which they are made to stick together according to known techniques. In this way it is possible for a fleece to be prepared which shows a very uniform tightness over the entire width. The equipment has been greatly simplified compared with known equipment in which, instead of four large units, four times, for instance, fifteen small units must be used.

Figure 4:
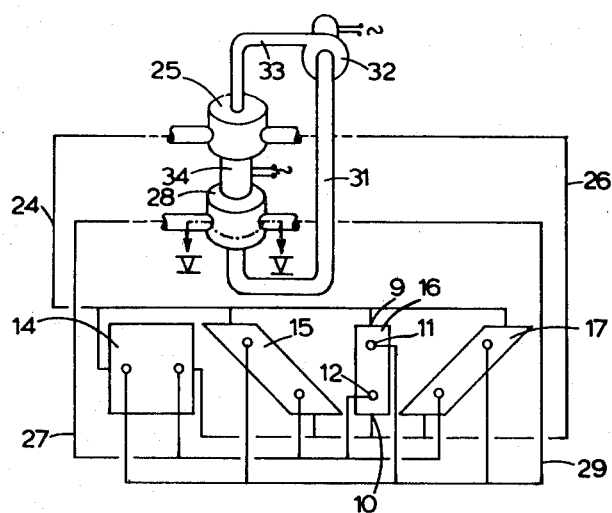

The four large units, 14, 15, 16 and 17, are once again schematically shown in FIG. 4. One of the injection apertures (including aperture 9) of each of the four units, 14, 15, 16 and 17, is connected by means of a tubular system, 24, with one of the two outlets of a change-over mechanism, 25, the other four injection apertures (including aperture 10) being connected by means of a tubular system, 26, with the other outlet of the change-over mechanism, 25. Likewise, one of the suction-off openings (including opening 12) of each of the four units, 14, 15, 16 and 17, is connected with one of the two outlets of a change-over mechanism, 28, by means of a tubular system, 27, whilst the other four suction-off openings (including opening 11) by means of a tubular system, 29, are connected with the other outlet of the change-over mechanism, 28.

Figure 5:
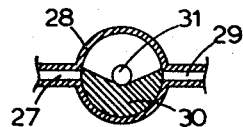

FIG. 5 represents a sectional view according to plane V of the change-over mechanism, 28. A rotary valve, 30, alternately connects one of the tubular systems, 27 and 29, with one of the ends of a suction line, 31, of a fan, 32. The change-over mechanisms, 25 and 28, are of identical construction. The change-over mechanism, 25, is connected by means of an injection line, 33, with the fan, 32. The rotary valves, 30, of the change-over mechanisms, 25 and 28, are driven by a motor, 34. The following shows that in this way two circulation systems are formed, which are alternately in operation. The relative positions of the two valves, 30, are such that at a certain moment the route of the air runs from the fan, 32, through the line, 33, the change-over mechanism, 25, the tubular system, 24, the injection apertures which include the aperture, 9, the housing or chamber, which include the housing or chamber, 7, of the four units, the draw-off opening which includes the opening, 12, the tubular system, 27, the change-over mechanism, 28, the suction line, 31, to the fan, 32. In the next cycle the route of the air runs from the fan, 32, through the line, 33, the change-over mechanism, 25, the tubular system, 26, the injection apertures which include the aperture, 10, the housing which include the housing or chamber, 7, of the four units, the draw-off openings which include the opening, 11, the tubular system, 29, the change-over mechanism, 28, the suction line, 31, to the fan.

The device according to the mode of realization described excells by simplicity and efficiency. Within the scope of the invention many variant realizations are possible.

I claim:

1. In a process for the preparation of a plastics fiber fleece, in which filaments are moved toward a conveying plane and, prior to their lying down on the conveying plane, are zigzagged, the improvement wherein the zigzag is effected by means causing air flow slanting upwards, hit the filaments in a free space, each such air flow being effected by simultaneously injecting air on one side of the said space and suctioning off air on the opposite side of said space.

2. Process according to claim 1, wherein the suctioned-off air is injected.

3. A device for the preparation of plastic fiber fleece comprising a conveying plane, means for feeding filaments towards said conveying plant, a chamber having substantially the same width as said conveying plant, and adopted for passage of said fleece from said feeding device through said chamber onto said conveying plane, said chamber being arranged between said conveying plane and said feeding device, said chamber having at least two injection apertures facing each other, and adopted for directing an air flow in a slanting upwards direction against the filaments of said fleece and with at least two suctioned-off openings, located at a higher level in said chamber, than said apertures, and means for suctioning off air from said chamber.

4. The device according to claim 3, wherein each said suctioned-off opening is connected, by means of a circulation system which includes a fan, with the oppositely opposed injection aperture.

5. The device according to claim 4, wherein a single fan is provided for the two said circulation systems, and further including twin change-over mechanisms, provided with drives, for the alternate operation of the two circulation systems.

* * * * *